(12) United States Patent
Hitit et al.

(10) Patent No.: US 12,098,451 B2
(45) Date of Patent: Sep. 24, 2024

(54) NICKEL-BASED BULK METALLIC GLASS ALLOYS CONTAINING HIGH AMOUNT OF REFRACTORY METAL AND BORON

(71) Applicant: AFYON KOCATEPE UNIVERSITESI REKTORLUGU, Afyonkarahisar (TR)

(72) Inventors: Aytekin Hitit, Afyonkarahisar (TR); Ziya Ozgur Yazici, Afyonkarahisar (TR); Hakan Sahin, Afyonkarahisar (TR); Pelin Ozturk Asgin, Afyonkarahisar (TR)

(73) Assignee: NOVALTEC ARGE DANISMANLIK METALURJI SAN. AND TRADE. LTD. ŞTI., Afyonkarahisar (TR)

(*) Notice: Subject to any disclaimer, the term of this patent is extended or adjusted under 35 U.S.C. 154(b) by 494 days.

(21) Appl. No.: 17/435,058

(22) PCT Filed: Nov. 26, 2019

(86) PCT No.: PCT/TR2019/050997
§ 371 (c)(1),
(2) Date: Aug. 31, 2021

(87) PCT Pub. No.: WO2020/190229
PCT Pub. Date: Sep. 24, 2020

(65) Prior Publication Data
US 2022/0162733 A1    May 26, 2022

(51) Int. Cl.
C22C 45/10    (2006.01)
C22C 19/03    (2006.01)
C22C 45/04    (2006.01)
C22F 1/10     (2006.01)

(52) U.S. Cl.
CPC .............. *C22C 45/04* (2013.01); *C22C 19/03* (2013.01); *C22F 1/10* (2013.01); *C22C 2200/02* (2013.01)

(58) Field of Classification Search
None
See application file for complete search history.

(56) References Cited

U.S. PATENT DOCUMENTS

| | | | |
|---|---|---|---|
| 4,210,443 A * | 7/1980 | Ray | C22C 45/02 148/403 |
| 4,410,490 A | 10/1983 | Ray et al. | |
| 2014/0130945 A1 | 5/2014 | Na et al. | |
| 2014/0238551 A1 | 8/2014 | Na et al. | |
| 2016/0090644 A1* | 3/2016 | Na | C22C 45/04 148/555 |

FOREIGN PATENT DOCUMENTS

| | | |
|---|---|---|
| CN | 1354274 A | 6/2002 |
| CN | 101532153 A | 9/2009 |
| CN | 103189539 A | 7/2013 |
| KR | 20010096915 A | 11/2001 |
| WO | 2012053570 A1 | 4/2012 |

* cited by examiner

*Primary Examiner* — George Wyszomierski
(74) *Attorney, Agent, or Firm* — Bayramoglu Law Offices LLC

(57) ABSTRACT

First nickel-based bulk metallic glass alloys having a high glass forming ability, wherein in the first nickel-based bulk metallic glass alloys both a phase having a high fracture toughness, a nickel solid solution and borides having a high hardness is formed by a heat treatment at temperatures above crystallization temperatures.

2 Claims, 4 Drawing Sheets

NICKEL-BASED BULK METALLIC GLASS ALLOYS CONTAINING HIGH AMOUNT OF REFRACTORY METAL AND BORON

CROSS REFERENCE TO THE RELATED APPLICATIONS

This application is the national stage entry of International Application No. PCT/TR2019/050997, filed on Nov. 26, 2019, which is based upon and claims priority to Turkish Patent Application No. 2019/04074 filed on Mar. 19, 2019, the entire contents of which are incorporated herein by reference.

TECHNICAL FIELD

The invention is related to the nickel-based bulk metallic glass alloys having high glass forming ability and containing high amount of refractory metal and boron in which both a phase having high fracture toughness, nickel solid solution and borides having high hardness can be formed by heat treatment at temperatures above the crystallization temperatures.

BACKGROUND

Metallic glasses are a new generation material group which has been studied intensively for the last 40 years due to their unique physical and chemical properties. In addition to these superior properties, it has been shown that metallic glasses can be used as a precursor for the production of composite materials. Metal matrix composites are conventionally obtained by co-sintering a phase or phases having hardness such as boride, nitride, and carbide with a metal matrix having high toughness such as cobalt, nickel, iron, and copper. As an alternative to this method, it is possible to obtain metal matrix composites by crystallizing the metallic glasses with heat treatment. Instead of conventional methods, there are many advantages of producing composite materials by heat treatment of metallic glasses. In order for the composite material obtained to have both high hardness and high toughness, at least one of the phases formed (precipitated) in the structure during the heat treatment must have high hardness and at least one of them must have high toughness. For the precipitation of the phase having high hardness, the composition of the alloy must have sufficiently high boron and/or carbon content. Thus, the boride and/or carbide phases precipitating during the heat treatment ensure that the composite material has a high hardness. Bulk metallic glass alloys containing a high amount of boron and/or carbon, which are generally Fe (iron), Co (cobalt) or Fe—Co based metallic glasses, exist in the literature, and it has been shown that composite materials having high hardness values can be obtained with heat treatment of these metallic glasses. However, existence of a phase or phases providing high fracture toughness in the microstructure has not been reported in any one of these studies. For this reason, fracture toughness of metal matrix composite materials which use metallic glasses as precursors in the production process carried out by heat treatment is quite low.

In addition, the methods of precipitating phases having high toughness by heat treatment in the structure of metallic glass alloys which have high hardness or reinforcing them with the phases having high toughness are followed. Since the hardness of metallic glasses is around 900-1200 HV, the obtained hardness value is low even if the fracture toughness of the composite material is increased. Because of the relatively low hardness of the obtained composite, it is not possible to use it in applications where high hardness is required.

SUMMARY

The invention is related to nickel-based bulk metallic glass alloys containing both a high amount of nickel and greater than 10 atomic % boron. By heat treating the developed nickel-based bulk metallic glasses at temperatures above their crystallization temperatures, both the nickel solid solution, which provides high fracture toughness and borides, which provide high hardness, precipitate. The nickel solid solution has a face-centered-cubic (FCC) structure and it contains some amount of cobalt and tungsten in addition to nickel. As a result, the obtained composite materials have both high hardness and high fracture toughness.

DETAILED DESCRIPTION OF THE EMBODIMENTS

Figure 1:
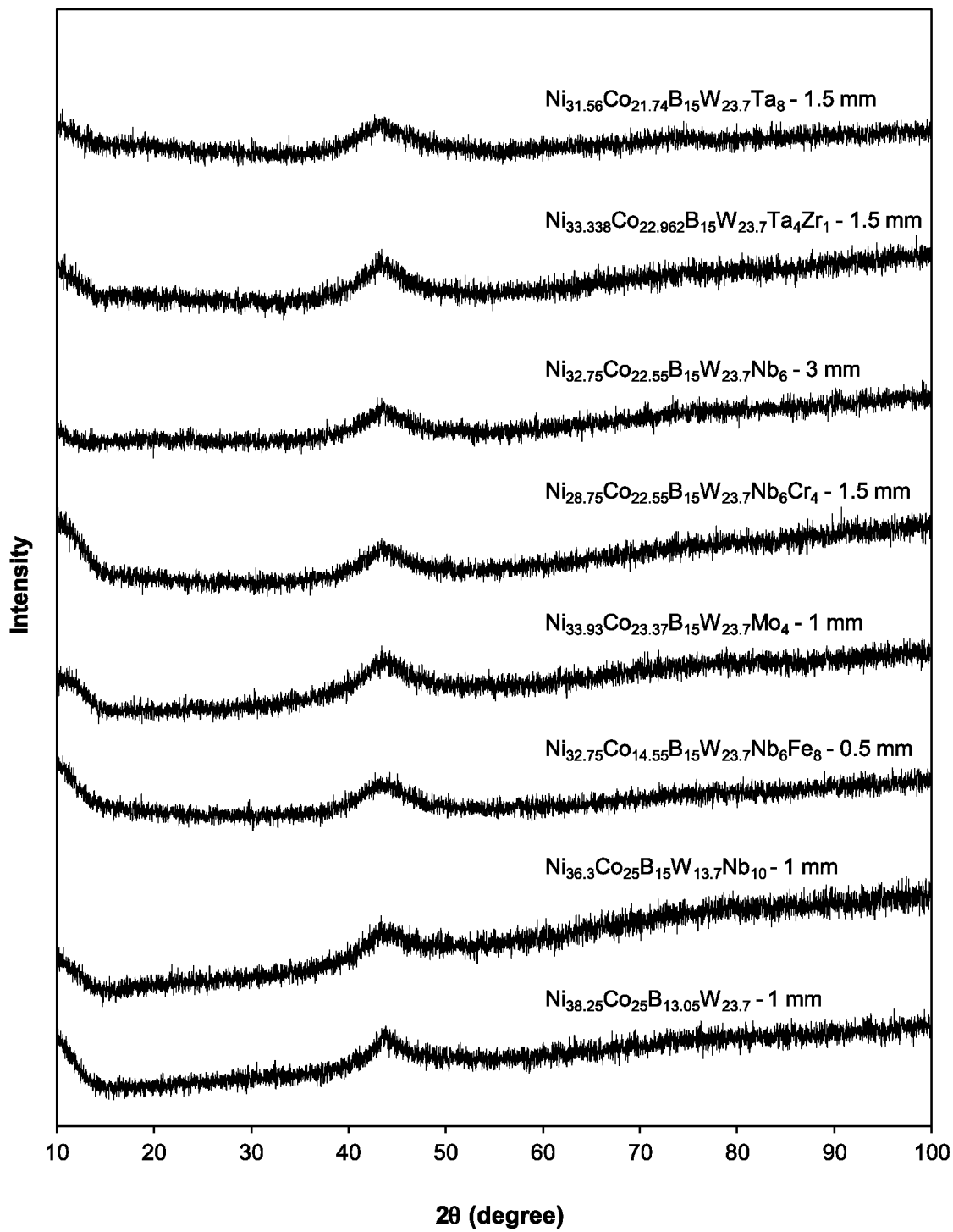
FIG. 1 X-ray diffraction (XRD) patterns of samples having critical casting thickness ($D_{critic}$) of some of the nickel-based bulk metallic glass alloys developed.

In order for the composite materials obtained by heat treatment of metallic glasses to have high toughness, it is necessary to precipitate a phase or phases having face-centered-cubic (FCC) structure. This can only be possible by heat treatment of copper or nickel-based metallic glasses. In the literature available to us so far, the existence of a copper or nickel-based bulk metallic glass which contains high amount (>10 atomic %) of boron and/or carbon and has critical casting thickness greater than 0.5 mm has not been reported. Critical casting thicknesses of some nickel-based metallic glass alloys containing high amounts of boron and/or carbon is 0.1 mm or less. Due to their low critical casting thickness, the use of these amorphous alloys and the composite materials obtained by the heat treatment of these amorphous alloys is very limited. For example, it is not possible to use these composite materials in structural applications, machine parts, and equipment with a cross-section of 0.5 mm or more, that require a high cross-sectional thickness, equal and greater than 0.5 mm. Instead, they can be used in applications with low cross-sectional thickness, which is less than 0.1 mm, such as thin coatings, thin films, and thin fibers.

The definition of the nominal composition used for the description of the developed nickel-based bulk metallic glass alloys having a critical casting thickness of at least 0.5 mm is given as follows:

$Ni_aCo_bW_cB_dM1_eM2_fM3_gM4_h$ defines

M1: At least one of Fe (iron), Cu (copper), Cr (chromium), Mn (manganese), and Al (aluminum) elements.

M2: At least one of Ti (titanium), Zr (zirconium), Er (erbium), Sm (samarium), Nd (neodymium), Y (yttrium), La (lanthanum), and Hf (hafnium) elements.

M3: At least one of Ta (tantalum), Nb (niobium), Mo (molybdenum), and V (vanadium) elements.

M4: At least one of C (carbon), Si (silicon), P (phosphorus), and Be (beryllium) elements.

The amounts of the components, a, b, c, d, e, f, g, and h are indicated on the atomic % basis. Here, a: 25-60, b: 8-35, c: 8-30, d: 12.1-30, e: 0-15, f: 0-10, g: 0-15, h: 0-15

| a + b + e + f: | changes between 33-75 |
| c + g: | changes between 8-40 |
| d + h: | changes between 12.1-30. |

The composition, critical casting thickness, which is the highest section thickness obtained in amorphous structure, thermal properties, which are glass transition, crystallization, and liquidus temperatures, and microhardness values of some of the nickel-based bulk metallic glass alloys developed are given in Table 1 as examples.

The alloys developed were obtained by arc melting and casting method. The critical casting thicknesses of the alloys were determined using casting molds with different cross-sectional thicknesses. The samples with different cross-sectional thickness produced were analyzed by X-ray diffraction (XRD) analysis. According to the results of XRD analysis, the maximum cross-sectional thickness at which an alloy can be obtained in a completely amorphous structure was determined as the critical casting thickness of that alloy. Since it is not possible to determine crystal phases at very small volume percentages by XRD analysis, crystals with the volume percentage up to 5% can be present in the structure of some of the alloys stated to be completely amorphous. The glass transition, Tg, and crystallization, $T_x$, temperature values of the nickel-based bulk metallic glass alloys given in Table 1 were determined by using a differential thermal calorimeter (DSC) with a heating rate of 20° C./min. The liquidus temperature, $T_l$, values of the nickel-based bulk metallic glass alloys given in Table 1 were determined by cooling the samples with a cooling rate of 20° C./min after the complete melting of the samples with DSC at 1570° C. The hardness values of the nickel-based bulk metallic glass alloys given in Table 1 were determined by applying 300 g (2.94 N) load for 15 seconds in Vickers microhardness tester. The microhardness measurement results given in Table 1 are the arithmetic mean of ten measurements made from different regions for each alloy.

TABLE 1

Critical casting thicknesses ($D_{critical}$), glass transition ($T_g$), crystallization ($T_x$), liquidus ($T_l$) temperatures and microhardness (HV) values of some of the nickel-based bulk metallic glass alloys developed.

| Composition (atomic %) | $D_{critical}$ (mm) | $T_g$ (° C.) | $T_x$ (° C.) | $T_L$ (° C.) | Hardness (HV) |
|---|---|---|---|---|---|
| $Ni_{36.3}Co_{25}B_{15}W_{23.7}$ | 0.5 | 581 | 636 | 1341 | 1151 |
| $Ni_{40.8}Co_{20}B_{13.92}W_{25.28}$ | 0.5 | 583 | 645 | 1340 | 1167 |
| $Ni_{38.25}Co_{25}B_{13.05}W_{23.7}$ | 1.0 | 571 | 632 | 1336 | 1130 |
| $Ni_{35.7}Co_{30}B_{12.18}W_{22.12}$ | 1.0 | 556 | 615 | 1322 | 1019 |
| $Ni_{35.12}Co_{24.18}B_{15}W_{23.7}Ta_2$ | 1 | 615 | 673 | 1333 | 1191 |
| $Ni_{33.93}Co_{23.37}B_{15}W_{23.7}Ta_4$ | 1 | 636 | 700 | 1318 | 1234 |
| $Ni_{32.75}Co_{22.55}B_{15}W_{23.7}Ta_6$ | 1 | 652 | 721 | 1308 | 1237 |
| $Ni_{31.56}Co_{21.74}B_{15}W_{23.7}Ta_8$ | 1.5 | 681 | 759 | 1294 | 1210 |
| $Ni_{30.38}Co_{20.92}B_{15}W_{23.7}Ta_{10}$ | 0.5 | 698 | 773 | 1282 | 1249 |
| $Ni_{33.93}Co_{23.37}B_{15}W_{23.7}Nb_4$ | 1.5 | 628 | 696 | 1303 | 1162 |
| $Ni_{32.75}Co_{22.55}B_{15}W_{23.7}Nb_6$ | 3 | 628 | 689 | 1280 | 1167 |
| $Ni_{31.56}Co_{21.74}B_{15}W_{23.7}Nb_8$ | 0.5 | 663 | 733 | 1254 | 1197 |
| $Ni_{30.38}Co_{20.92}B_{15}W_{23.7}Nb_{10}$ | 0.5 | 672 | 735 | 1235 | 1215 |
| $Ni_{33.93}Co_{23.37}B_{15}W_{23.7}Mo_4$ | 1 | 612 | 672 | 1329 | 1175 |
| $Ni_{36.3}Co_{25}B_{15}W_{21.7}Ta_2$ | 1 | 600 | 655 | 1328 | 1126 |
| $Ni_{36.3}Co_{25}B_{15}W_{19.7}Ta_4$ | 1 | 597 | 664 | 1313 | 1153 |
| $Ni_{36.3}Co_{25}B_{15}W_{17.7}Ta_6$ | 1 | 612 | 679 | 1286 | 1135 |
| $Ni_{36.3}Co_{25}B_{15}W_{15.7}Ta_8$ | 1 | 605 | 672 | 1300 | 1126 |
| $Ni_{36.3}Co_{25}B_{15}W_{13.7}Ta_{10}$ | 1 | 619 | 686 | 1271 | 1139 |
| $Ni_{36.3}Co_{25}B_{15}W_{21.7}Nb_2$ | 1 | 588 | 651 | 1321 | 1101 |
| $Ni_{36.3}Co_{25}B_{15}W_{19.7}Nb_4$ | 1 | 588 | 656 | 1302 | 1090 |
| $Ni_{36.3}Co_{25}B_{15}W_{17.7}Nb_6$ | 1 | 596 | 665 | 1279 | 1118 |
| $Ni_{36.3}Co_{25}B_{15}W_{15.7}Nb_8$ | 1 | 600 | 669 | 1256 | 1095 |
| $Ni_{36.3}Co_{25}B_{15}W_{13.7}Nb_{10}$ | 1 | 603 | 670 | 1241 | 1100 |
| $Ni_{36.3}Co_{25}B_{15}W_{11.7}Nb_{12}$ | 0.5 | 616 | 677 | 1234 | 1248 |
| $Ni_{35.116}Co_{24.184}B_{15}W_{23.7}C_2$ | 1.5 | 579 | 643 | 1321 | 1163 |
| $Ni_{32.75}Co_{22.55}B_{15}W_{23.7}Nb_4C_2$ | 1 | 623 | 683 | 1294 | 1183 |
| $Ni_{32.75}Co_{22.55}B_{13}W_{23.7}Nb_6C_2$ | 0.5 | 631 | 708 | 1280 | 1147 |
| $Ni_{28.75}Co_{22.55}B_{15}W_{23.7}Nb_6Cr_4$ | 1.5 | 620 | 694 | 1281 | 1135 |
| $Ni_{32.75}Co_{14.55}B_{15}W_{23.7}Nb_6Fe_8$ | 0.5 | 607 | 676 | 1277 | 1254 |
| $Ni_{37}Co_{23}B_{15}W_{23}C_2$ | 0.5 | 574 | 634 | 1338 | 1132 |
| $Ni_{33.93}Co_{23.37}B_{15}W_{19.7}Nb_4Mo_4$ | 1 | 625 | 686 | 1289 | 1152 |
| $Ni_{33.93}Co_{23.37}B_{15}W_{19.7}Nb_4Ta_4$ | 0.5 | 652 | 714 | 1277 | 1126 |
| $Ni_{33.93}Co_{23.37}B_{15}W_{19.7}Nb_8$ | 0.5 | 638 | 707 | 1259 | 1100 |
| $Ni_{33.634}Co_{23.166}B_{15}W_{23.7}Ta_4Zr_{0.5}$ | 1.5 | 628 | 708 | 1310 | 1190 |
| $Ni_{33.338}Co_{22.962}B_{15}W_{23.7}Ta_4Zr_1$ | 1.5 | 636 | 709 | 1316 | 1183 |
| $Ni_{33.042}Co_{22.758}B_{15}W_{23.7}Ta_4Zr_{1.5}$ | 1 | 638 | 719 | 1310 | 1142 |
| $Ni_{38.25}Co_{20}B_{13.05}W_{23.7}Fe_5$ | 0.5 | 561 | 608 | 1336 | 1144 |

Figure 2:
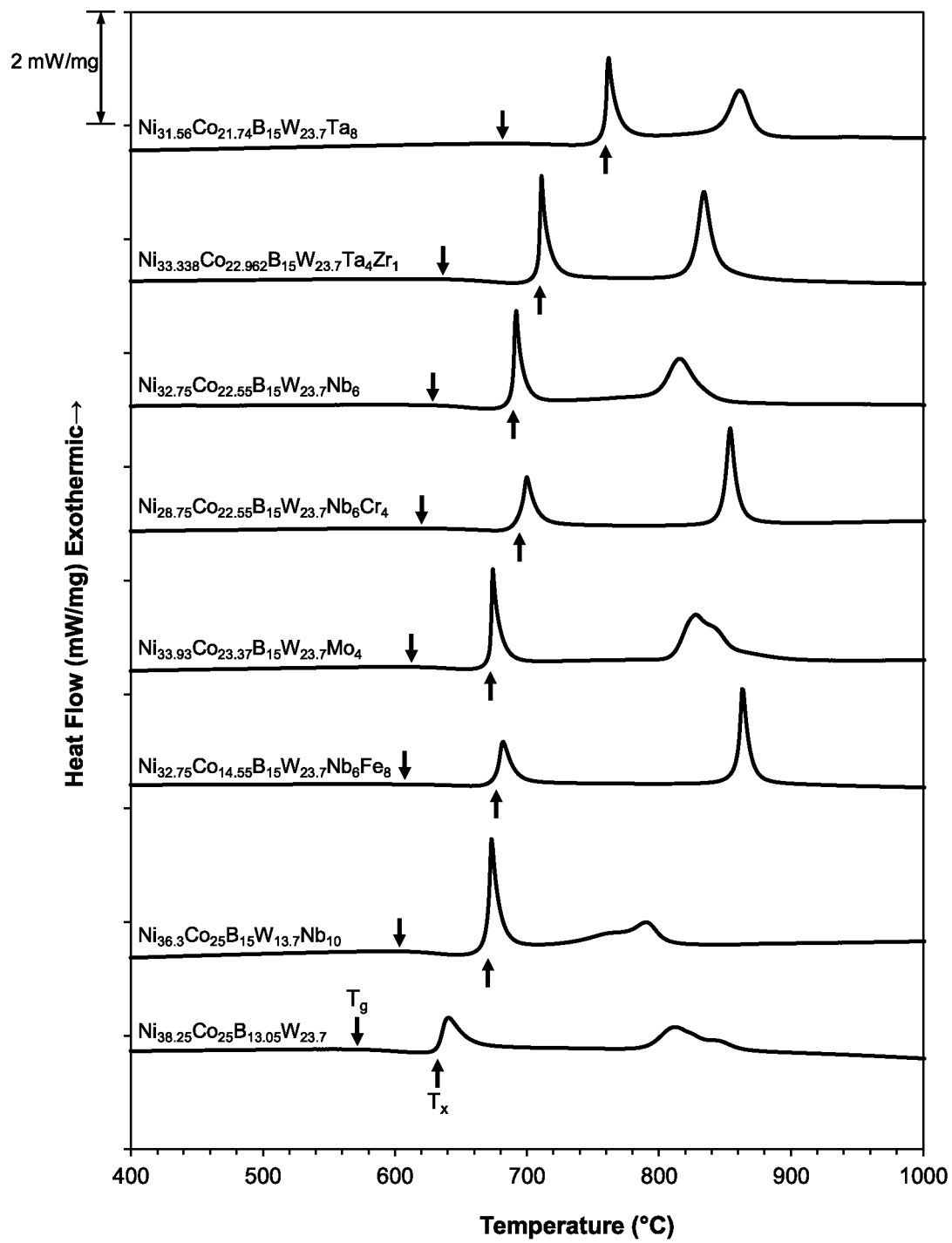
FIG. 2 DSC analysis (heating) results of the alloys whose XRD analysis results are given.
Figure 3:
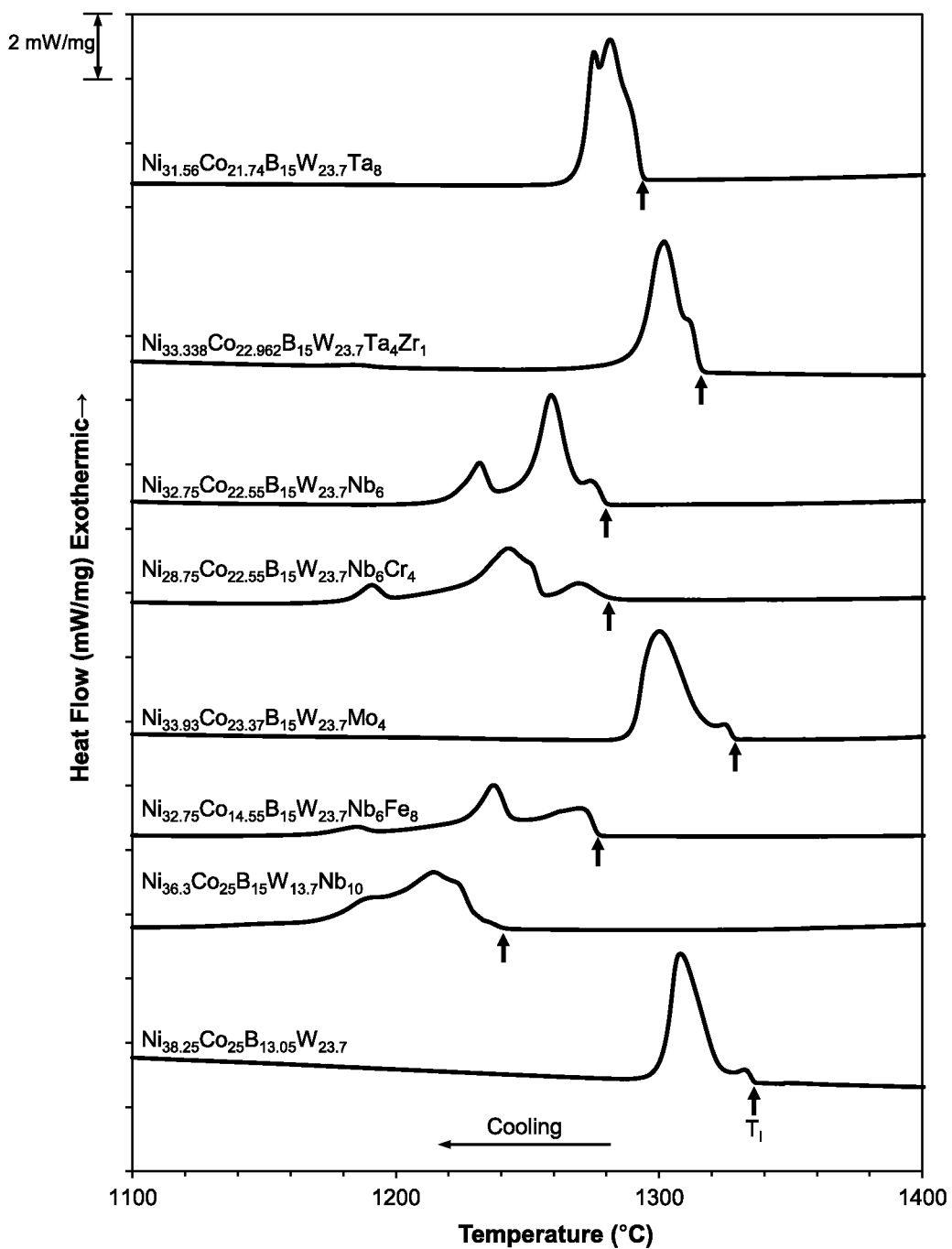
FIG. 3 DSC analysis (cooling) results of the alloys whose XRD analysis results are given.
Figure 4:
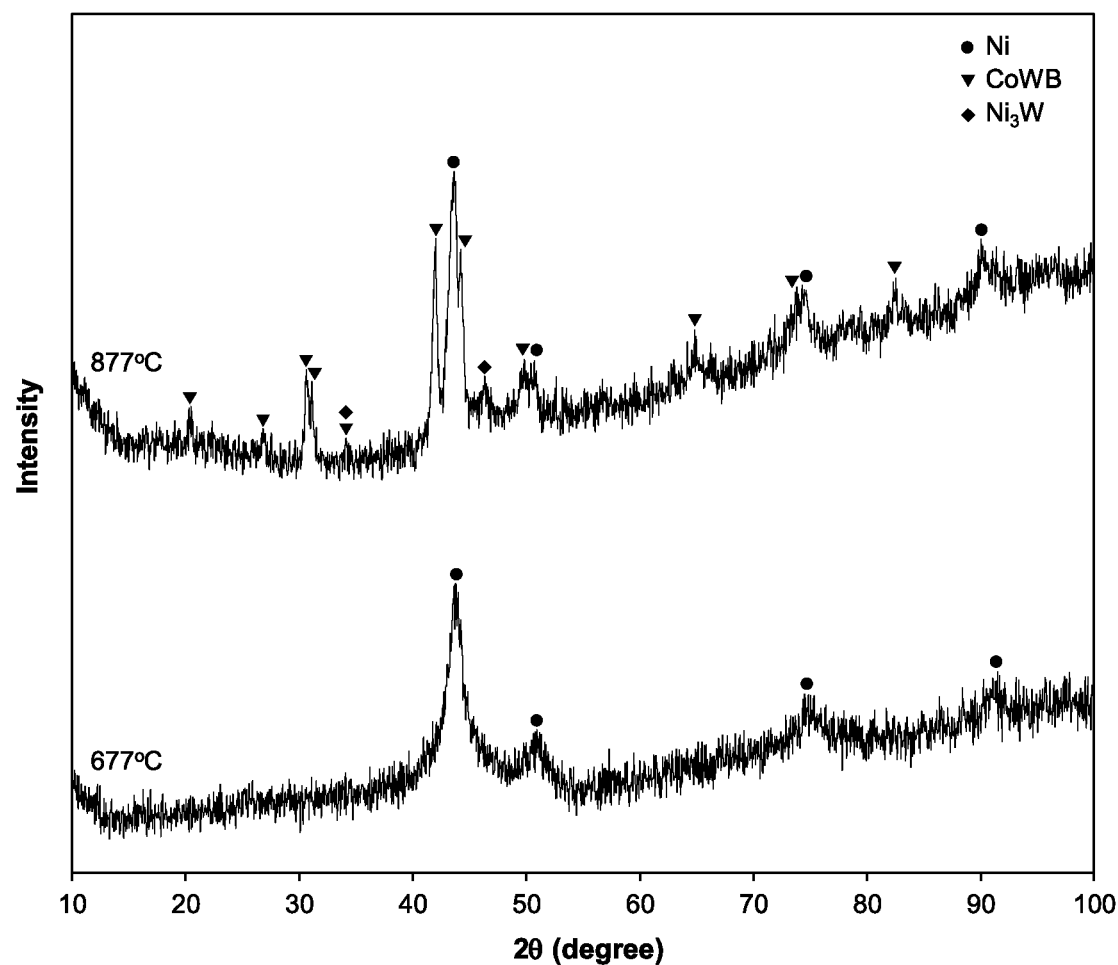
FIG. 4 XRD patterns of the samples of $Ni_{38.25}Co_{25}B_{13.05}W_{23.7}$ metallic glass alloy heat treated at the temperatures above the crystallization temperature.

The results of XRD analysis of samples with critical casting thickness, $D_{critical}$, of some of the nickel-based bulk metallic glass alloys which are given in Table 1 are shown in FIG. 1. The results of DSC analysis of the alloys whose XRD results are given in FIG. 1 are also given in FIGS. 2 and 3. In FIG. 2, glass transition ($T_g$) and crystallization ($T_x$) temperatures of each alloy are indicated in the results of DSC analysis, which were acquired with a 20° C./minute heating rate. In FIG. 3, liquidus temperatures, $T_l$, of each alloy are indicated in the results of DSC analysis, which were acquired with 20° C./minute cooling rate, after total melting had been obtained. In FIG. 4, XRD patterns of the samples which are heat treated at temperatures above the crystallization temperature of the $Ni_{38.25}CO_{25}B_{13.05}W_{23.7}$ metallic glass alloy are shown.

The nickel-based bulk metallic glass alloys shown in Table 1 have been given as examples without pursuing a goal of the scope of protection. When the composition percentages in the table are summed up, examples of how a 100% alloy content can be formed are revealed. The major components of the nickel-based bulk metallic glass alloys constituting the invention are nickel (Ni), cobalt (Co), tungsten (W) and boron (B) elements. These four elements must be present simultaneously in all alloys at the percentages, which are a %, b %, c %, and d %, mentioned above. It is not obligatory to include the developed alloys by adding the elements named M1, M2, M3, and M4 at the mentioned percentages, which are e %, f %, g %, and h %, respectively, into the composition of the alloy in the formulation in addition to these four major elements, which are Ni, Co, W and B.

Alloys are produced by arc melting in a vacuum arc furnace. The samples of various cross-sectional thickness of the alloys were produced by suction casting method in a vacuum arc furnace using electrolytic copper molds. Moreover, products having a thick section can be produced when different production methods such as injection casting, tilt casting, drop casting, etc, using a vacuum arc or induction furnace are preferred.

Furthermore, the developed nickel-based metallic glass alloys can be produced in powder form either by atomization methods or by the method of producing thin foils (strips) with the melt spinning method first and then grinding the thin foils (strips). These powders of these metallic glass alloys can be transformed into the bulk forms by sintering through various sintering methods such as cold isostatic pressing (CIP), hot pressing, hot isostatic pressing (HIP), and spark plasma sintering (SPS). Also, these metallic glass powders can be used in 3D printing systems developed in nowadays for obtaining bulk pieces in the form of metallic glass. In addition, it is to possible produce durable coatings on weak materials by using these metallic glass powders with various thermal coating methods The alloys whose critical casting thickness value, the maximum thickness that it can be obtained in completely amorphous structure, is less than 0.5 mm can be produced in powder form either by atomization methods or by the method of producing as thin foils(strips) with the melt spinning method first and then grinding the thin foils (strips). Depending on the composition of the alloy, these powders may be completely amorphous and for some alloys, may contain some nickel solid solution in addition to the amorphous phase. It is possible to obtain bulk pieces with desired shapes and sizes having completely amorphous structure by sintering metallic glass powders having completely amorphous structures with various sintering methods such as CIP, Hot pressing, HIP and SPS. Also, it is possible to produce bulk pieces with desired shapes and sizes having partially amorphous structure, which contains some amount of nickel solid solution, by sintering metallic glass powders containing some amount of nickel solid solution with various sintering methods such as CIP, Hot pressing, HIP and SPS. Furthermore, it may be possible to produce durable coatings for weak materials by using these completely amorphous metallic glass powders and/or metallic glass powders containing some nickel solid solution by powder coating methods.

The nickel-based bulk metallic glass alloys of our invention have not been developed as a result of the modification of any previously developed nickel-based bulk metallic glass alloys. The major components of the nickel-based bulk metallic glass alloys constituting the invention are the elements nickel (Ni), cobalt (Co), tungsten (W) and boron (B). By the presence of these four elements simultaneously in all alloys in the above-mentioned percentages, a, b, c, and d %, the nickel-based bulk metallic glass alloys which are the subject of the invention have been developed. The thermal properties, $T_g$, $T_x$ and $T_1$, and critical casting thicknesses, $D_{critical}$, of the alloys developed are improved further by adding the elements named M1, M2, M3 and M4 in the specified percentages, which are e, f, g and h %, respectively, into the composition of the alloy in addition to these four major elements, Ni, Co, W and B. The biggest difference between the developed nickel-based bulk metallic glass alloys and other nickel-based bulk metallic glass alloys is the high boron content they contain, which is equal or greater than 12.1 atomic %. Because, in order for the obtained composite material to have both high hardness and high toughness, at least one of the phases formed (precipitated) in the structure during the heat treatment must have high hardness and also at least one of them must have high toughness. For this reason, for the precipitation of borides having high hardness at high volume percentage, the composition of the alloy must contain 12.1 atomic % or more of the boron element.

Nickel (Ni), cobalt (Co), tungsten (W) and boron (B), which are the alloying elements constituting the invention, must be present in all alloys. Because in order for the precipitation of the nickel solid solution having high toughness in the structure of the composite materials obtained by heat treatment of the developed nickel-based bulk metallic glass alloys, nickel element must be present in the composition of all alloys. In order to form borides, especially CoWB phase, which will precipitate as a result of heat treatment and ensure that the composite has high hardness, the elements forming this phase, Co, W and B, must be present in the composition of the alloys. The percentages of these elements in the alloys are in the specified ranges, a, b, c, and d %. The elements grouped as M1, M2, M3, and M4 are used to increase the glass forming ability. For example, while the critical casting thickness of $Ni_{36.3}Co_{25}B_{15}W_{23.7}$ alloy containing only Ni, Co, W, and B elements is 0.5 mm, the critical casting thickness of $Ni_{35.116}Co_{24.184}B_{15}W_{23.7}C_2$ alloy, which contains 2 atomic % carbon (C) (M4), is 1.5 mm. Similarly, the critical casting thickness of $Ni_{32.75}CO_{22.55}B_{15}W_{23.7}Nb_6$ alloy, which contains 6 atomic % niobium (Nb), is 3 mm. In addition, the critical casting thickness of $Ni_{33.338}Co_{22.962}B_{15}W_{23.7}TaZr_1$ alloy in which more than one additive elements are used and containing tantalum (Ta) (M2) and zirconium (Zr) (M3) is 1.5 mm. The developed nickel-based bulk metallic glass alloys within the scope of our invention contain both high amount of nickel and more than 12 atomic % boron. With the heat treatment of these developed nickel-based bulk metallic glass alloys at temperatures above the crystallization temperatures given in Table 1, both the nickel solid solution which provides high fracture toughness, has face-centered-cubic (FCC) structure and contains some amount of cobalt and tungsten and the borides providing high hardness precipitate. Since the crystallization temperatures of the alloys vary, the heat treatment temperature to be used is different for each alloy. For example, for the precipitation of nickel solid solution which provides high fracture toughness, has face-centered-cubic (FCC) structure and contains some amount of cobalt and tungsten and the borides providing high hardness, while $Ni_{38.25}Co_{25}B_{13.05}W_{23.7}$ alloy should be heat treated at 632° C. and above, $Ni_{30.38}Co_{20.92}B_{15}W_{23.7}Ta_{10}$ alloy should be heat treated at 773° C. and above. The phases that precipitated in the structure of the samples obtained as a result of heat treatment of two different completely amorphous samples of $Ni_{38.25}CO_{25}B_{13.05}W_{23.7}$ alloy at 677° C. and 877° C. for 5 minutes are shown in FIG. 4. As seen in the XRD results, only the nickel solid solution (Ni) having FCC structure precipitate as a result of the heat treatment of $Ni_{38.25}Co_{25}B_{13.05}W_{23.7}$ alloy having amorphous structure at 677° C. for 5 min. As a result of heat treatment at a higher temperature, 877° C., for 5 min, CoWB boride phase and very low amount of $Ni_3W$ phase precipitate in addition to nickel solid solution. The composite materials to be obtained as a result of this will have both high hardness and high fracture toughness.

The nickel-based bulk metallic glass alloys that are developed within the scope of our invention are the nickel-based bulk metallic glass alloys in the structure of which both a phase having fracture toughness, nickel solid solution, and borides having high hardness, especially CoWB phase, can be formed as a result of exposing these alloys to heat treatment at temperatures above the crystallization temperatures. The space group of CoWB phase, which has orthorhombic structure, is Pnma. Also, lattice parameters of CoWB phase are a=5.784 Å (Angstrom), b=3.262 Å, and c=6.757 Å. Moreover, the Vickers hardness value of CoWB phase has been reported as 4300±230 $HV_{0.05}$ under a load of 50 g.

What is claimed is:

1. A nickel-based bulk metallic glass alloy containing a refractory metal and boron, comprising
$Ni_a Co_b W_c B_d M1_e M2_f M3_g M4_h$ formula, wherein M1 is at least one element selected from the group consisting of Fe, Cu, Cr, Mn, and Al; M2 is at least one element selected from the group consisting of Ti, Zr, Er, Sm, Nd, Y, La, and Hf; M3 is at least one element selected from the group consisting of Ta, Nb, Mo, and V; M4 is at least one element selected from the group consisting of C, Si, P, and Be; and values according to an atomic % basis are as follows:

an amount of a component a is between 25 and 60,
an amount of a component b is between 8 and 35,
an amount of a component c is between 8 and 30,
an amount of a component d is between 12.1 and 30,
an amount of a component e is between 0 and 15,
an amount of a component f is between 0 and 10,
an amount of a component g is between 0 and 15,
an amount of a component h is between 0 and 15.

2. The nickel-based bulk metallic glass alloy according to claim 1, wherein
a total of a+b+e+f component amount according to the atomic % basis is between 33 and 75,
a total of c+g component amount according to the atomic % basis is between 8 and 40,
a total of d+h component amount according to the atomic % basis is between 12.1 and 30.

* * * * *